(No Model.) 3 Sheets—Sheet 1.

S. M. LILLIE.
BONE BLACK DRIER.

No. 329,324. Patented Oct. 27, 1885.

Witnesses:
Jacob C. Muench.
H. Anschicks.

Inventor:
S. Morris Lillie (No Model.)

S. M. LILLIE.
BONE BLACK DRIER.

No. 329,324.   Patented Oct. 27, 1885.

3 Sheets—Sheet 3.

Witnesses:
Jacob C. Muench.
H. Anschicks.

Inventor:
S. Morris Lillie

UNITED STATES PATENT OFFICE.

S. MORRIS LILLIE, OF PHILADELPHIA, PENNSYLVANIA.

BONE-BLACK DRIER.

SPECIFICATION forming part of Letters Patent No. 329,324, dated October 27, 1885.

Application filed September 17, 1885. Serial No. 177,386. (No model.)

*To all whom it may concern:*

Be it known that I, S. MORRIS LILLIE, a citizen of the United States, residing at Philadelphia, in the county of Philadelphia and State of Pennsylvania, have invented a new and useful process and apparatus for utilizing the waste heat of the bone-black revivifying-kilns of sugar-refineries in drying bone-black preparatory to its being passed through the retorts of the kilns, and in heating water or other liquids for the purposes of the refinery, of which (the said process and apparatus) the following is a specification, reference being had to the accompanying drawings.

My process consists, first, in drawing or forcing the products of combustion of the kiln through the wet black contained in suitable receptacles, the products of combustion being first cooled to a degree by mixing them with cooler air or gases, so that the danger of igniting the black may be lessened; second, in drawing warm air from around the kiln through moist black contained in other suitable receptacles by which the black is more or less dried and the air cooled and ladened with moisture, and in using the air thus cooled and moistened for mixing with and cooling the products of combustion, as above set forth; and, third, it consists in collecting the steam generated in the drier and retorts of the kiln, and in using the same for heating water or for heating or evaporating sugar solutions.

The apparatus consists of a drier located above the kiln, and of exhausting apparatus connected with the drier and with the retorts of the kiln for drawing air and products of combustion through the wet black in the drier, and for exhausting the steam formed in the retorts from the same. It also comprises suitable condensers for utilizing the vapors and steam drawn from the black in heating water or in heating or evaporating sugar solutions.

Figure 1:
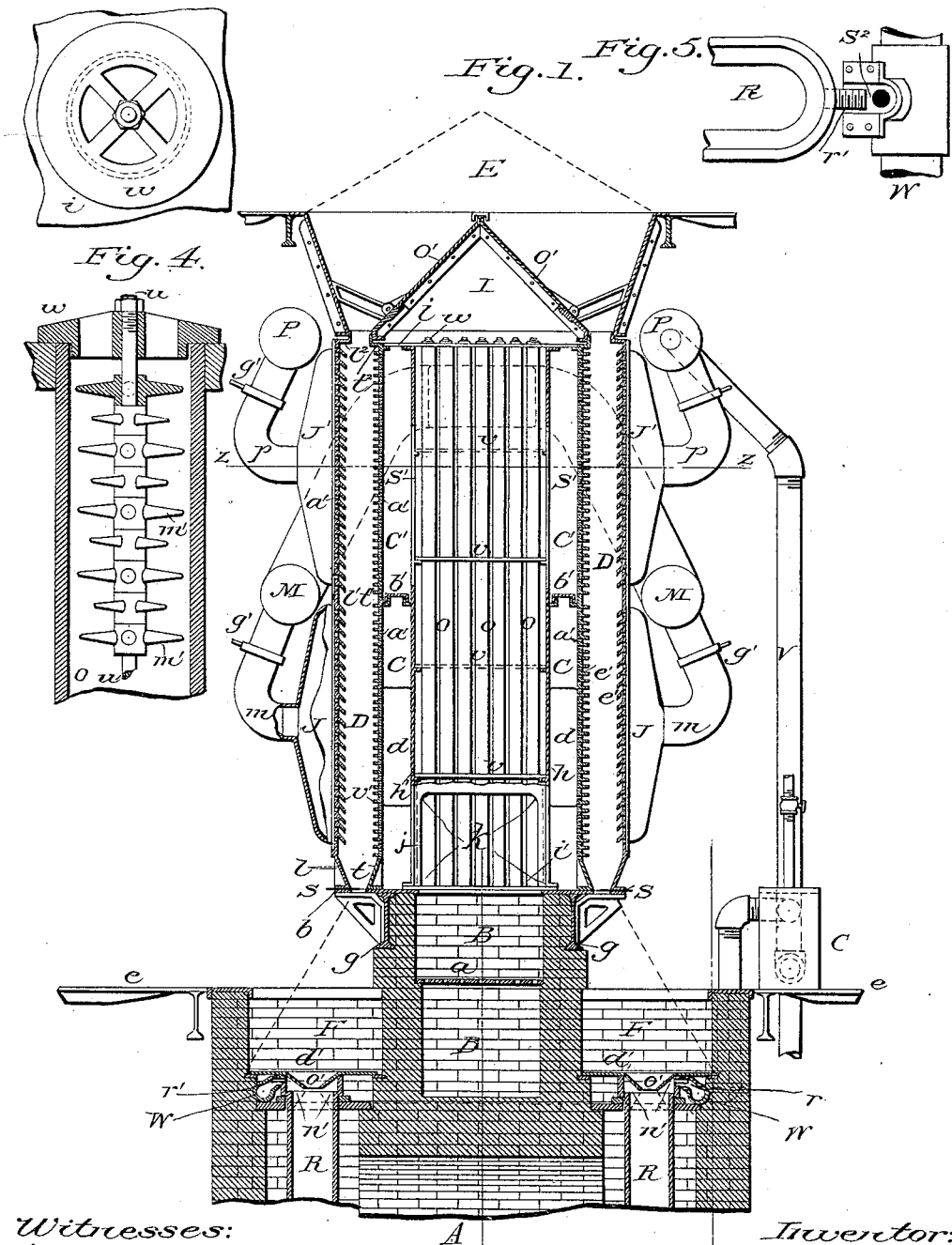
Figure 2:
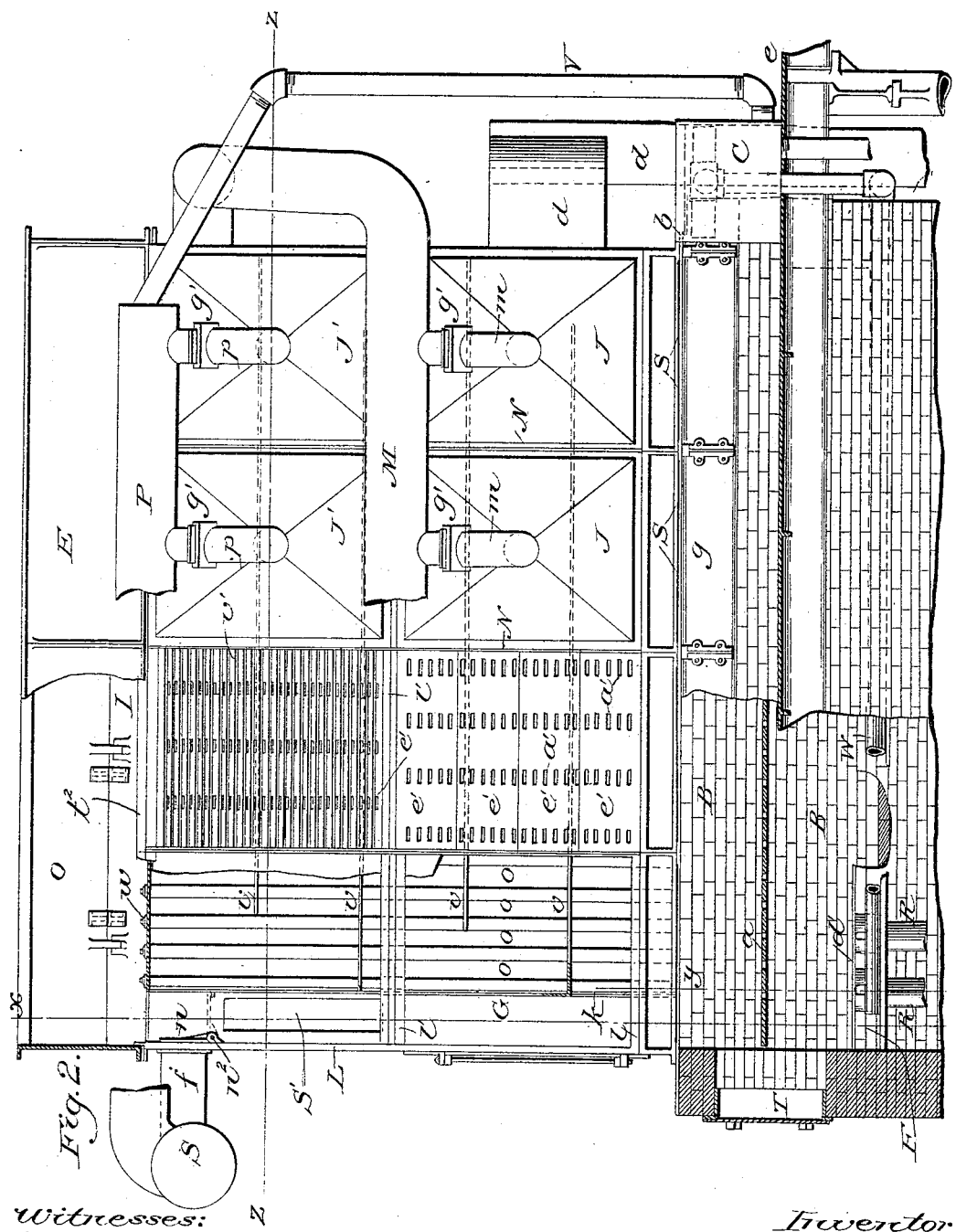
Figure 3:
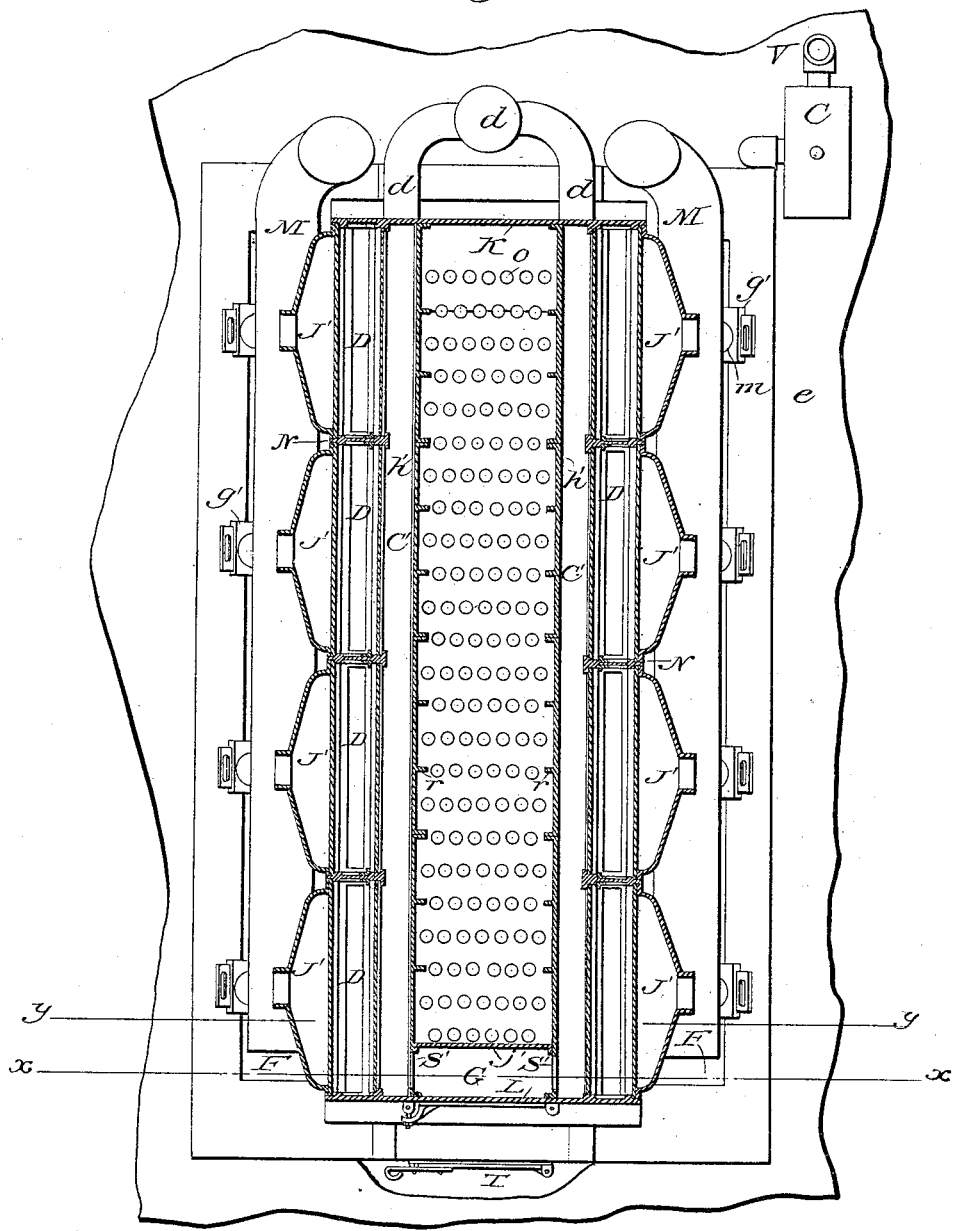

The apparatus is illustrated in the drawings, of which Figure 1 is a vertical transverse section of the drier along the broken line $x$, and of the upper portion of the kiln along the broken line $y$, Fig. 2. Fig. 2 is a side elevation of the drier and of the upper portion of the kiln, with portions of each broken away to disclose the interior construction. Fig. 3 is a horizontal section through the drier along the broken line $z$, Figs. 1 and 2, while the other figures are views of details.

In the drawings, A is the fire-chamber of the kiln, having one or more rows of retorts, R, ranged on each side in the usual manner. B is a longitudinal flue above the fire-chamber, with which the fire-chamber connects by suitable flues (not shown) containing dampers by which the draught of the fire is regulated. The flue B is divided into two by the horizontal perforated diaphragm $a$, which tends to distribute the products of combustion from the kiln equally among the tubes of the surface-heater, presently to be mentioned. Upon the girders $g$ and the walls of the flue B rests the bed-plate $b$, upon which is built the drier. The drier consists of a surface-heater resting upon the bed-plate over a central longitudinal opening in the same; of the channels D, with perforated walls on each side, for the black to be dried, opening above into a hopper, E, and below through passages in the bed-plate, provided with slides $s$, into boxes F, into which the upper ends of retorts R open; of the hoods J, covering the outside perforated walls of the channels D; of the air-passages $c\ c'$ on each side, between the surface-heater and the black-channels D; of the vertical channels G between the end of the surface-heater and the front plate of the drier; and of the horizontal flue I between the upper tube-plate of the surface-heater and the plates of the hopper E, which flue communicates either through the passage $f$, with an exhausting apparatus or with a vertical channel, G, depending upon the position of the damper $n$, which in its normal position closes the passage $f$, as shown. The surface-heater consists of a battery of tubes, $o$, opening above and below, respectively, through the tube-plates $i\ i'$, and contained in the chamber formed by the said tube-plates, the vertical walls $h\ h'$ extending from end to end of the drier, the rear end plate, K, of the drier and the vertical partition $j$ extending between the partitions $h\ h'$ a short distance from the front end plate, L, of the drier. In the interior of the heater are contained horizontal partial diaphragms $v$, through which the tubes extend with a snug fit, the diaphragms being located equally distant from each other and from the tube-plates $i$ $i'$, and touching alternately the end plates, $j$ K, of the heater, thus forming a longitudinally-zigzag channel back and forth among the tubes, the upper extremity of which communicates through the rear end plate, K, of of the heater and drier with the mains M, while the lower extremity communicates with the vertical chamber G by an opening, $k$, through the front end plate of the heater. The rows of tubes Q break spaces with each other in the direction of the length of the heater, and the side walls, $h$ $h'$, bear vertical ledges $r$, which project out between the rows of tubes, so that there are no unobstructed channels through the heater longitudinally, as a result of which gases or vapors that are made to flow along the zigzag channel of the surface-heater must repeatedly impinge upon and flow around in contact with the heated surfaces of the tubes, which form the conditions the most favorable to the transfer of heat from the tubes to the gases or vapors. Each tube $o$ is closed above by a cap, $w$, having perforations in it, from the center of which depends a rod into the interior of the tube, on which rod are slipped star-shape pieces $m'$, (as shown in Fig. 4, which is a vertical axial section of one of the tubes $o$,) formed of cast-iron, earthenware, or other material. These pieces suspended in the interior of the tubes serve the purpose of absorbing heat from the hot product of combustion which flows up through the tubes, and of radiating it to the walls of the tubes, by which it is absorbed, conducted, and delivered to the moist air, which during the operation of the drier is flowing through the heater along the zigzag channel, all as hereinafter set forth. The advantage which the presence of such heat absorbents and radiants in the tubes possesses arises from the fact that gases, particularly when dry, radiate heat very poorly and, excepting through contact, lose it slowly. By filling the interior of the tubes with pieces of solid substances, especially with those which absorb heat readily, numerous absorbent points are presented to the contact of the gases by which the heat is taken up from the latter and radiated to the walls of the tubes. It is not necessary, it is apparent, that the material should be shaped into stars or be suspended on a rod, as shown, for other shapes and other methods of support may be used without departing from the spirit of this feature of my invention. In similar constructions—namely, those in which currents of heated gases are used for heating-surfaces, which surfaces in turn transfer the heat to other substances—the spaces among the absorbing surfaces may be filled to a greater or less extent with such heat absorbing and radiating devices with the effect of a greater absorption of heat for a given area of "heating-surfaces." The flues of tubular boilers, vertical or horizontal, and the spaces between the tubes of water-tube boilers may, for example, have such heat-arresters arranged in them, with the effect of a marked economy in heating-surface. I therefore do not limit my claims in this respect to its use in my char-drier alone, but intend to cover its use in any heater in which hot gases are employed as the heating agent and to which the invention is applicable. Another end served by these heat-absorbers is that of arresting the suspended matters contained in the products of combustion, and thereby preventing their passing into the black when the gases are drawn through it, as hereinafter set forth. The perforated caps $w$, which close the upper ends of the tubes, by limiting the area of the passages for the escape of the gases from the tubes, tend to effect an even distribution of the gases among the tubes, which is of course essential to the most effective working of the heater. To this equal distribution the perforated plate $a$ in the flue B contributes, as well as the caps $w$ of the heater-tubes $o$. The hollow side walls of the drier are each formed of a framing consisting of the vertical divisional plates N, (which divide the hollow side walls each into four char-channels, D,) and of the horizontal framing-pieces $l$ $l'$ $l^2$ of the front wall, and $t$ $t'$ $t^2$ of the inner wall. The divisional plates N and framing-pieces $t$ and $l$ divide the outer and inner walls into panels, two to each channel D, which panels are each filled with plates $e'$, which rest in rabbets formed on the edge of framing-pieces and divisional plates, and which are held in position in any suitable manner. These plates are each perforated by a number of horizontal rows of vertically-narrow slots $a'$, and each bears on its inner surface a ledge or narrow shelf, $v'$, above each row of slots, which shelf prevents the black with which in practice the space between the walls is filled from flowing through the slots. The inclination of the shelf to the plates may be varied. On the plates of the inner walls, through which the desiccating air or gases pass to the black, as hereinafter set forth, the shelves may be vertical to the plates, and in case of the plates of the front wall, through which the air leaves the black, the shelves should be inclined downward, over their respective rows of slots, as such a construction will permit of a stronger draft of air through the column of black, without carrying black through the perforations, than would be possible with shelves perpendicular to the plates. The width vertically of the plates $e'$ may be sufficient so that one may bear all the shelves and fill the space of one panel; or, on the other hand, the plates may be only wide enough to bear one shelf $v'$ and the corresponding perforations; or, in other words, there may be as many plates $e'$ in a panel as there are shelves $v'$, in which case the panel is filled, in effect, with a number of slats supported at the ends and intermediately by bits of metal which correspond to the plates $e'$. If the shelves are made of sufficiently heavy metal to support the weight or pressure of the black, they may be joined together or supported merely at the ends, the spaces between the shelves being quite open. I prefer, however, the construction shown, as it insures a more perfect distribution of the currents of air through the black, and for this same reason the perforations of the inner wall are arranged so as to break spaces with those of the front wall both vertically and horizontally. Each of the panels of the outer wall is covered air-tight by a hood, J, the lower set of hoods, J, on each side communicating by a central opening in each, and by the branch mains $m$ and mains M, through the rear end of the drier, with the interior of the surface-heater above the upper partial diaphragm, $v$, while the upper set of hoods, J', communicate through the branches $p$ and main P with the large main S, which leads to an exhausting fan and condenser. (Not shown.) The branch mains $m$ and $p$ are each provided with a gate, $g'$. The spaces between the hollow side walls, respectively and the surface-heater are each divided into two compartments, $c$ $c'$, by the horizontal partition $b'$, extending from end to end of the drier on a level with the middle horizontal member, $t'$, of the side wall frame, of which compartments the lower one, $c$, on each side communicates through a main, $d$, with the space underneath the flooring $e$, while the upper one, $c'$, communicates by a passage, $s'$, through the extended heater-walls $h$ with a vertical chamber, G, at the end of the drier, which latter also communicates at the bottom by the passage $k$, through the end of the surface-heater, with the interior of the same below the lower diaphragm, $v$, as hereinbefore described, and above with the flue I, above the surface-heater, supposing the damper $n$ to be open, as shown in the drawings. When this damper $n$, which revolves on an arbor $n^2$, is lowered or closed, the communication between the chamber G and the flue I is closed, and the latter then communicates through the passage $f$ with the exhausting-main $s$, by which the draft for the kiln-fire is then produced. The inclined plates O' O' above the flue I, and forming a part of the hopper E, are each divided along a horizontal line, and the parts hinged, thus forming doors or wings, which, when thrown back, permit access to the surface-heater tubes $o$. By means of a door, T, at the end of the flue B access may be had to the latter. The mouths of the retorts R are covered with a plate or plates, $d'$, having funnels $o'$, leading one into the interior of each retort, and through which the black flows into the latter. In each retort there is an annular space, $n'$, formed between the upper surface of the black in the retort, (indicated by the dotted line in the drawings, Fig. 1,) the walls of the retort, and the conical funnels $o'$. This space $n'$ in each retort communicates through a branch, $r'$, and socket, $s^2$, (seen in detail, Fig. 5,) with the main W, which communicates, through a surface or spray condenser, C, and mains V P, &c., with the exhausting apparatus. The condenser C' is provided with a water (or sugar solution) connection for condensing the steam brought to it through the main W. When the kiln and drier are in operation, the steam and gases which are generated in the retorts rise through the black and collect in the annular space $n'$, from which they are drawn through the manifolds W to the condenser C, in which the water vapor is condensed by the water or sugar solution flowing through the condenser, with the effect of heating the latter, while the incondensable gases are carried off through the mains V P, &c.

The operation of the above-described apparatus and the advantages of the same may be set forth as follows, at first stating, however, that during the drying and the revivification of the bone-black by this drier and kiln the retorts $r$ and the channels D are always filled with black; that the black lies in the hopper E and in the boxes F, as indicated by the dotted lines, and that there is a slow movement of the black (which is fed into the hopper E) downward through the channels D and retorts R, due to a uniform or intermittent drawing of the black from the bottoms of the retorts, or, rather, from the cooler tubes with which the retorts terminate below. Supposing, now, the exhausting-fans to be in motion, the products of combustion are drawn from the fire-chamber of the kiln into the lower compartment of the horizontal flue B; thence through the distributing-plate $a$, upward through the tubes $o$ of the surface-heater, (surrendering during their passage their heat to the heat-arresters $m'$ and to the walls of the tubes,) into the flue I; thence into the vertical chamber G, where it mingles with moist air, which has been drawn warm from below the floor $e$, (under which collects the air heated by contact with the walls, coolers, and other parts of the kiln, and by the radiant heat from the same,) into the air-passages $c$; thence through the black in the lower portion of the channels D, partially drying the black and being itself cooled and laden with moisture; then through the hoods J, branches $m$, and mains M, into and through the surface-heater, entering the latter above the upper partial partition, $v$, flowing back and forth around the partial partitions, until it issues from the heater below the lower partition into the vertical chamber G, where it meets and mingles with the products of combustion, and with them flows through the openings $s'$, in the vertical partitions $h$ into the air-passages $c'$, and thence through the black in the upper portion of the chamber D, into the hoods J', and then through the branches $p$ and mains P to the main S, which leads to the exhausting apparatus and to a condenser, (not shown,) in which latter the warm vapors with which the air and gases are laden are condensed by cold water, which is heated to a degree thereby, preparatory to being further heated and used in the refinery. The steam formed by evaporation of water from the black while in retorts R is exhausted from the retorts through the branches $r'$ into the cross-main or manifold W; thence through the condenser C, in which it is used for heating water or sugar solutions, or for evaporating sugar solutions, if suitably constructed evaporating apparatus be substituted for the condenser C. The air and the products of combustion in their passage through the black, as described, evaporate and bear away with them much of the moisture contained in the black, which in consequence is comparatively dry when it passes from the drier into the boxes F and retorts R. The desiccation is partly effected in the upper portions of the channels D by the mixed air and products of combustion, after which a further portion of the moisture is removed by the warm air drawn through the same black while in the lower sections of the channels. Any moisture remaining in the black after it leaves the drier is driven from it while in the retorts R, the resulting vapor passing from the retorts to the condenser C, as hereinbefore described. By means of the gates $g'$ in the branch mains $m\ p$ the volume of air and gases drawn through the black back of the various hoods may be regulated so as to cause the relative percentages of moisture in the black issuing from the lower ends of the four channels D in each hollow side wall of the drier to be anything desired. For example, if it should be found that certain retorts of the kiln burn the black less effectively than others, then the gates $g'$ should be so set that more gases and air shall be drawn through the black-channels D, which deliver black to to these retorts than through the channels which deliver to the more effective retorts, as a result of which the black which flows through the former into the less effective retorts will be drier than that which flows from the latter into more effective retorts; and so it is that by dividing the passages for the black in a drier into a number of independent channels, and by having the desiccation in each channel under control independently of the others, as in the case in this drier, differences in the effectiveness of the retorts in the kiln may be compensated for in the drier by properly regulating the desiccation in the various channels.

My process contemplates and I prefer drawing the products of combustion through the black, for thereby the heat in the same may be more comprehensively utilized in drying black than by any other method that I know of, and also because the products of combustion have comparatively little oxidizing-power, and are consequently less liable to destroy the carbon of the bone-black by oxidization than is the case with air heated to the same temperature. Should it occur, however, that the fuel being used at any time was of such a character that it would be injurious to the black to pass the products of combustion through it, the construction of my drier is such that they may be passed from the drier in another way than through the black, and the heat in the products of combustion be utilized only in heating air in a surface-heater, which heated air is afterward drawn through the black. This may be done by lowering the damper $n$, (see Fig. 2), which closes the communication between the flue I and the vertical chamber G, and allows the products of combustion to pass through the connecting-main $f$ to the exhausting-main S, while the air which has been reheated in the surface-heater by the products of combustion is alone drawn through the black into the upper hoods, J'. If a constant supply of a proper fuel—such as good anthracite—could be assured, the surface-heater might be dispensed with and the moist air from the lower hoods, J, be mixed directly with the products of combustion in a suitable chamber, such as would be left by the removal of the tubes $o$ of the surface-heater, and the mixture drawn through the black. When the products of combustion are passed through the black, the draft for the kiln-fire is necessarily an artificial one. When the products of combustion are only used in a surface-heater for heating air to be drawn through the black, the draft should also be an artificial one, if it is desired that the heat in the products of combustion should be utilized in drying black to the greatest extent possible, for otherwise the gases could not be cooled below the degree necessary to produce naturally—$i, e.$, by chimney—the draft required for the fire, while with an artificial draft the gases may be cooled to a much lower degree and the heat utilized. The artificial draft in the latter case may be effected by delivering air under pressure into a closed ash-pit or by exhausting from above, which exhaustion may be done by the same apparatus that draws the air through the black, as exemplified in the drawings, or by independent exhausting apparatus, such as a fan or a chimney of other furnaces—that of the boilers of the refinery, for example. One of the features of the arrangement of apparatus shown and described which I claim as mine is that which permits this using, when the products of combustion are not drawn through the black, of an artificial draft, in connection with the use of a surface-heater, for heating air to be drawn through the black, the merit of the arrangement being that the amount of heat which may be absorbed from the products of combustion is not restricted by the necessity of leaving sufficient heat in the gases to supply a natural draft for the fire, which heat is in that case not available for drying black.

My method also contemplates, as hereinbefore set forth, the employment of air for mixing with and cooling the products of combustion prior to drawing them through the black, which, having been drawn warm from below the floor $e$, is passed through the partially-dried black in the lower portion of the drier, and thereby cooled and laden with a moisture to a degree, the advantages of which proceeding will appear from the following considerations. It is desirable to utilize the heat in the hot air which arises from around the kiln and its cooler-tubes and collects under the floor e, as well as that which is contained in the hot products of combustion, and this can be done either by drawing the air and products of combustion through the black separately or by mixing the air with the hot products of combustion and drawing the mixture through. If the first method is followed, the ignition of the black and the destruction of its carbon by the hot products of combustion may be relied upon, for although the products of combustion may be drawn with safety through the black at a higher temperature than air, on account of their lesser oxidizing-power they cannot be thus drawn through at the high temperature at which they enter drier without great danger. If the second method is followed, there is still imminent danger of igniting and destroying the black, particularly in the lower portion of the drier, where the black is comparatively dry, as the mixture will be too hot to be drawn through the black without risk, unless my system of first abstracting and utilizing the heat from the hot air is followed, or unless an excessive amount of the cooling-air is used. Following my system, the hot air drawn from below the floor e is not only cooled to a comparatively low temperature by being drawn through the black in the lower part of the drier, but is also laden to a degree with moisture abstracted from the black, and in this condition has a much greater cooling effect on the products of combustion when mixed with them than before, both on account of its lower temperature and of the added moisture, which latter also plays the part of a dilutant of the air and the mixture, and reduces its oxidizing-power. This mixture can be drawn through the moist black in the upper part of the drier without danger to the carbon and without having used an excessive amount of cooling-air. When the products of combustion are not drawn through the black, but are used only in a surface-heater for heating air to be passed through the black, a similar advantage attends drawing the hot air from beneath the floor e first through the black in the lower part of the channels D and then through the surface-heater—namely, that, owing to its lower temperature and its contained moisture, it will, when heated by the surface-heater, be of lower temperature, and be less likely to destroy the carbon of the black than would be the case if drawn from below the floor e immediately through the surface-heater. An important result of the presence of the moisture in the air in this case is that it renders the latter more absorbent of radiant heat, and therefore more effective in abstracting heat from the products of combustion in the surface-heater, for, as is well known, dry air and dry elementary gases cannot be heated by radiant heat, but only by contact, but are good absorbers of radiant heat when moist; and so it follows that by first passing the air through the black and moistening it the radiant heat within the heater is made available for heating the air, and with a given size heater a greater proportion of heat may be absorbed from the products of combustion and utilized than if the air were not first moistened in this way. The efficiency of the heater could likewise be increased by arranging "heat-arresters" among the tubes similar to those in the interior of the tubes, which arresters would absorb the heat radiated from the tubes and give it up again by contact or conduction to the air passing through the heater. The presence of such heat-arresters would be of especial importance were the air passing through the heater dry, and therefore only capable of being heated by contact.

It is to be observed as an important feature of my drier that the hotter mixture of the products of combustion and air and the reheated air, when it is used by itself, are only drawn through the black which is wettest and most difficult to ignite—namely, that in the upper portions of the channels D—while the cooler air from below the floor e is alone drawn through the partially-dried and more easily ignited black in the lower portions of the drier; and it is to be borne in mind, in connection with the above remarks concerning the destruction of the carbon of the bone-black, that in proportion as more of the moisture of the black is removed from it in the drier, and less of it in the retorts R, the temperature of the products of combustion, as they enter the drier, and that of the reheated air from the surface-heater, will be higher, as less heat will be absorbed from products of combustion in the kiln, and therefore the more perfect the desiccation in the drier the greater will be the need for such precautions being taken as are to be found in this process and drier to prevent the ignition and destruction of the carbon of the black by the gases and air drawn through it.

As will have been observed, separate condensers are used respectively for condensing and utilizing for heating purposes the vapors from the retorts R and those from the drier, the reasons for which are that the vapors from the retorts consist mostly of steam mixed with but little air and non-condensable gases, and are more adapted for use in surface-condensers and in evaporating apparatus than the vapors from the drier, which are composed more largely of air and incondensable gases, and are better adapted for condensation in a spray-condenser, although they, too, may be used in a surface-condenser if it is properly constructed; and, further, that owing to the destructive distillation in the retorts of the organic matter in the black which has been absorbed by the latter from the sugar solution, and to the gases and tarry matters formed thereby, it might be desirable at times to keep the condensed retort-vapors separate and by themselves. These vapors may, however, be sent to the condenser for the drier at any time by stopping the supply of the condensing-liquid to the condenser C, in which case the retort-vapors will pass on from the condenser via the mains V P S to the condenser for the drier.

Owing to lack of room, the condenser for the drier-vapors is not shown in the drawings; but I judge that a mention of a condenser as one of any of the common species—such, for example, as the shower-condensers often used for vacuum-pans—adapted to the special conditions of large quantities of incondensable air and gases mixed with the condensable water vapors will be sufficiently explicit.

A condenser adapted for use under these special conditions is illustrated, described, and claimed in another and pending application, in which are also claimed certain features common to the apparatus shown in that and in this application. It is therefore to be understood that these features common to both, though unclaimed in this application, are not abandoned by me.

The process and sub-processes described in this specification in connection with the apparatus are described and claimed in another and pending application, and are hereby disclaimed for this application, in accordance with a ruling of the Patent Office prohibiting the joining of apparatus and process claims in the same application.

Thus having described my invention, I claim as mine and wish to secure to myself by Letters Patent of the United States—

1. A drier located above a bone-black-revivifying kiln and consisting of the following elements, viz: horizontal flue B, surface-heater with vertical tubes above the flue B, horizontal flue I above surface-heater, vertical chamber G, chambers $c$ $c'$ on each side of the surface-heater, hollow walls D, having perforated sides and opening above into the hopper E and below into boxes F, lower set of hoods, J, and upper set of hoods, J', covering air-tight the outer face of each wall, and exhausting apparatus connected by mains P and $p$ with the upper series of hoods, J', the various parts connected together and operating in conjunction, substantially as specified.

2. In a char-drier, the hollow walls D, for containing the char to be dried, and having perforated sides, chamber or chambers $c$, covering one face of each hollow wall and having connections for bringing heated gases to them, chamber or chambers J, covering the other and opposite faces of the walls, and exhausting apparatus connected by suitable mains with the chamber or chambers J, and operating to draw air or gases from the chamber or chambers $c$ through the hollow walls and the moist black contained therein, substantially as specified.

3. The combination, with a char-drier in which the products of combustion from the kiln in connection with which the drier is used are employed in a surface-heater in heating air to be drawn through the black in the drier for the drying of the same, of exhausting apparatus communicating with the flue or chamber, such as I, into which the cooled products of combustion flow from the surface-heater, and operating to effect a draft for the kiln-fire independently of the temperature of its products of combustion, substantially as specified.

4. In a char-drier, the combination of a central surface-heater having vertical flue-tubes, with air-chambers, char-channels, and exhaust-chambers arranged symmetrically on each side of the surface-heater in the order specified, all connected and working in combination, substantially as specified.

5. The combination, with a bone-black-revivifying kiln and superimposed drier operating on the principle described, of the floor $e$, or its equivalent, for retaining the heated air which rises from around the various parts of the kiln, conduits leading from the space beneath the floor $e$ to the air-channels of the drier, and exhausting apparatus operating to draw the heated air from below the floor through the said conduits and through the channels and black in the drier, substantially as specified.

6. In a surface-heater, tubes which break spaces with each other in the direction along which the matters to be heated flow through the heater, in combination with ribs $r$, parallel to the tubes and projecting from the side walls of the heater among the tubes, the effect of the combination being to leave no free channels along which the matters to be heated might flow, and so avoid contact with the surfaces of the heating-tubes, substantially as specified.

7. In the surface-heater of a char-drier, the combination, with the tubes in the chamber through which the air and gases to be heated flow, of partial partitions $v$, which are parallel to the tube-plates, and which form the interior of the heater into a zigzag channel, through which the air or gases to be heated are led back and forth among the tubes, entering the heater-chamber through a port at one end of the zigzag channel and leaving it through one at the other end, substantially as specified.

8. With the tubes $o$ of the surface-heater, the combination of a perforated diaphragm, $a$, in the chamber B, from which the gaseous products of combustion flow into the tubes of the heater, the diaphragm operating to distribute the gases more evenly among the heater-tubes, substantially as specified.

9. The combination, with the tubes of the surface-heater of a char-drier, of perforated caps $w$, closing the ends of the tubes and operating to cause a more even distribution of the products of combustion among the tubes, substantially as specified.

10. In a surface-heater in which hot gases—such as products of combustion—are used for heating other substances, the combination, with the flues or heating-surfaces, of "heat-arresters" formed of metal, earthenware, or other material, arranged in the flues or passages through which the hot gases flow, and operating to absorb the heat by contact from the passing gases, and to radiate the same upon the heating-surfaces, by them to be absorbed and conducted to the matters to be heated, substantially as specified.

11. The combination, with the vertical flues o of a surface-heater, of the perforated caps w, rods u, suspended in the interior of the tubes from the caps w, and star or other shaped pieces of heat-absorbing substances strung on the rod in each tube, the pieces acting as heat-arresters to absorb heat by contact from the hot gases and to radiate it upon the walls of the tubes, substantially as specified.

12. In a surface-heater in which air or other gases are heated, the arrangement, as specified, in the channels in the heater through which the said air or gases to be heated flow, of heat-arresters formed of solid heat-absorbent substances, the heat-arresters operating to absorb the heat radiated from the heating-surfaces and to transfer it through contact to the air or gases to be heated.

13. In a char-drier constructed substantially as shown and specified, the vertical divisional plates N, dividing the hollow side walls through which the black flows into two or more separate or distinct channels, D, hoods J, one covering the outer face of each channel opposite the lower air-channel, c, hoods J', covering, respectively, the outer faces of the channels opposite the upper air-channels, c', the hoods J communicating through the mains M and branches m with the surface-heater of the drier, and the hoods J' through the branches p and mains P S with an exhausting apparatus, substantially as described.

14. In a char-drier constructed substantially as described, gates g', or equivalent devices, located in the mains or branches leading from the exhaust-chambers of the drier to the exhausting apparatus, by means of which gates the flow of air or gases through the black back of said exhaust-chambers may be regulated as desired.

15. In a char-drier operating substantially as described, char-channels, such as D, formed with perforated sides or walls, air chamber or chambers c on the one side of the channels, hood or hoods J, covering air-tight the other face of each channel, the hoods of each channel being independent of those of the other channels, exhausting apparatus connected with several hoods by suitable connecting-mains, and gates g' or equivalents in the connecting-mains by which the draft of air or gases through the several channels, and consequently the desiccation of the black in each, may be regulated, substantially as specified.

16. In a char-drier located above a revivifying-kiln and delivering char to the retorts of the same, in which drier the desiccation of the char is effected by passing heated air or gases through it as it flows downward through the char-passages of the drier, char-passages divided into a number of vertical sections, each section delivering char to a certain number of the retorts below, and the combination, with each vertical section, of means – such, for example, as the separate exhaust pipes and gates g' in the drawings—by which the draft of air or gases through the black in each section may be regulated independently of the other sections, the object of the arrangement being to permit the regulating the degree of desiccation of the black delivered to the different retorts of the kiln, and so to compensate for differences in the efficiency of the latter, substantially as specified.

17. The combination, in the construction of the hollow side walls or char-passages, D, of a char-drier, (in which drier the char is desiccated by passing currents of air or currents of air or gases through it,) of the vertical divisional plates N and end plates, L R, horizontal members $t\ t'\ t^2$ and $l\ l'\ l^2$, extending between the vertical plates and dividing the two walls of the char-passages into panels, and perforated plates e', filling the said panels, substantially as specified.

18. In a char-drier operating substantially as described, char-passages, with walls constructed in panels, as set forth, and hoods J, one covering each panel of the outer walls of the char-passages, each hood communicating with exhausting apparatus through intermediate connecting mains or apparatus, substantially as specified.

19. The combination, with the retorts of a char-revivifying kiln, of plates d', covering the mouths of the retorts, and having funnels o' projecting one into each retort, nipples r', and manifolds W, with sockets $s^2$, the combination affording means for collecting and conducting away from the retorts the vapors formed in the same, substantially as specified.

20. The combination, with the retorts of a char-revivifying kiln, of a condenser, conduits connecting the retorts with the condenser, and means for drawing the vapors formed in the retorts through the conduits to the condenser, substantially as specified.

21. In a char-drier in which the products of combustion from the kiln-fire are used in a surface-heater for heating the air to be drawn through the char in the drier, the combination, with the flue, such as I, into which cooled products of combustion pass from the surface-heater, of two flues or conduits, such as f and G, one of which leads directly into a flue or main, such as S, leading to draft-producing apparatus, while the other leads to the rear or induction side of the channels, with perforate sides in which the black to be dried is contained, and of a suitable damper, such as n', or its equivalent, which may be operated to either send the cooled products of combustion through one of the two conduits to the draft main or through the other conduit to the rear of the char-channels, thence to be drawn through the char, substantially as specified.

22. The construction of the inclined plates o o' of the hopper E as hinged doors or wings, which, when thrown back or open, give access to the interior of the drier, substantially as specified.

23. The combination of a bone-black kiln and drier, two condensers, one connected with the drier by suitable mains, and the other with the retorts of the kilns by other suitable mains, and proper exhausting apparatus or equivalent means for drawing the water vapors evolved in the drier through its condenser, and the vapors generated in the retorts through their condenser, the object of the combination and of separate condensers for the drier and for the retorts being substantially as specified.

S. MORRIS LILLIE.

Witnesses:
  JACOB C. MUENCH,
  FRED. P. LIESEL.